April 13, 1943.  E. F. SCHUBERT  2,316,461
TIRE PRESSURE SIGNAL
Filed Feb. 23, 1942
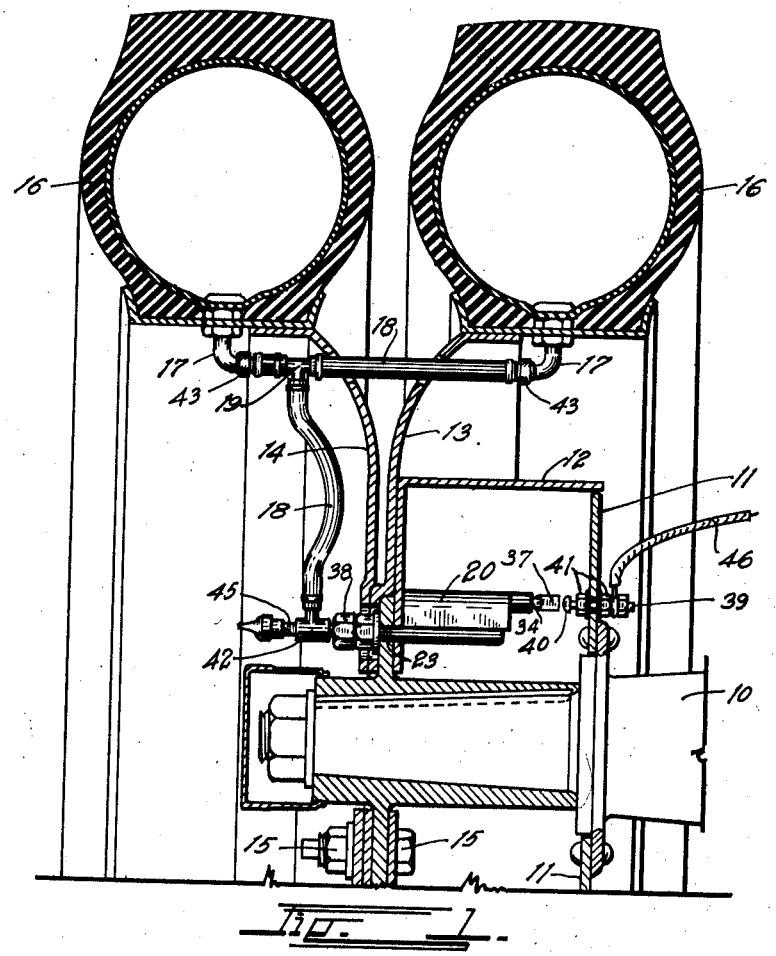
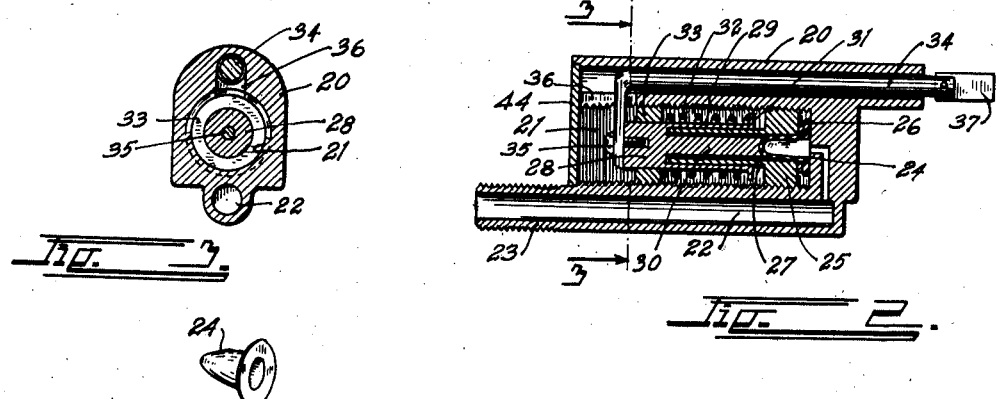
INVENTOR.
EDWARD F. SCHUBERT.
BY
ATTORNEY.

_Patented Apr. 13, 1943_                                                      2,316,461

UNITED STATES PATENT OFFICE 2,316,461

TIRE PRESSURE SIGNAL

Edward F. Schubert, Keenesburg, Colo.

Application February 23, 1942, Serial No. 431,989

3 Claims. (Cl. 200—58)

This invention relates to an under-inflation signal for pneumatic tired vehicles and has for its principal object the provision of a simple, compact device which can be placed within the brake drum of a wheel and which will operate to close a signal circuit to notify the driver that the air pressure in one or more of the tires has dropped below a certain predetermined minimum for safe and economical driving and to so construct the device that there can be no leakage of air therethrough.

It is extremely difficult for the average driver to judge the inflation in the tires. This is especially true in dual wheeled vehicles. It may often happen in the latter case that through leaks, one of the tires of a dual wheel will become deflated more than the other tire. This results in over-loading the tire with the higher pressure and this may not become apparent to the driver until an opportunity is had to check the tire pressures. With this device, however, the driver would be informed immediately should any tire, either on dual wheels or single tired wheels, become deflated below the required pressure.

This invention is especially valuable at the present time due to the necessity for conserving rubber by keeping the tires inflated to the most efficient pressure for long wear.

Other objects of the invention are: to construct a device of this character sufficiently small to be installed in a standard brake drum without interference with the braking mechanism; to provide means whereby the amount of minimum pressure may be pre-set to any desired point; to provide a device of this character which will equalize the pressure in a pair of dual tires and yet which will prevent, in case of accident to the one tire, the complete deflation of the other; and to provide a device which will not require any changes to be made in the tires, tubes, tire valves, wheels, brake drums, or brake discs, and which will not interfere with the removal and replacement of the wheels or tires.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a fragmentary section through a typical pair of dual wheels illustrating the invention in place thereon;

Fig. 2 is a substantially full sized longitudinal section through the operating mechanism employed in the invention;

Fig. 3 is a cross section therethrough, taken on the line 3—3, Fig. 2; and

Fig. 4 is a detail, perspective view illustrating the flexible, expanding element employed in the invention.

In Fig. 1, a typical vehicle axle is indicated at 10 carrying the usual brake disc 11 closing the inner face of a typical brake drum 12 for enclosing the usual brake shoes of the vehicle. An inner wheel 13 and an outer wheel 14 are secured to the brake drum 12 by means of the usual wheel bolts 15. The wheels 13 and 14 carry the usual pneumatic tires 16 from the inner tubes of which, the standard filling valve stems 17 project.

The improved circuit closing mechanism is installed within the brake drum 12 and is connected, by means of a flexible hose or other conduit 18, through a T-fitting 19 and couplings 43 with both of the valve stems 17. The operating mechanism of the improved signal is mounted in a housing 20. A central operating chamber 21 opening to one extremity of the housing and is provided with an internally threaded wall. The open extremity of the chamber 21 may be closed, if desired, by means of a cap plate 44.

An air passage 22 is formed along one side of the chamber 21 and terminates beyond the open extremity thereof in a threaded nipple 23. The other extremity of the air passage 22 enters the closed end of the chamber 21. A flanged cup 24 of rubber or other expansible material is clamped over the opening of the air passage 22 within the chamber 21 by means of a guide bushing 25 which acts to clamp a gasket 26 against the flange of the cup.

The cup 24 extends into a guide tube 27 concentrically projecting from the bushing 25. The guide tube 27 guides the movements of a plunger 28. The plunger is provided with a tubular skirt 29, which slides freely over the tube 27, and with an internal stem 30 which slides freely within the tube 27 against the head of the cup 24.

The skirt 29 of the plunger is formed with a flange 31 at its inner extremity. A compression spring 32 is compressed against the flange 31 by means of an annular spring bushing 33. The spring bushing 33 and the guide bushing 25 are both threaded into the internal threads of the chamber 21.

The head of the plunger 28 extends through the bushing 33 and an L-shaped contact rod 34 is secured thereto by means of a suitable attachment screw 35. The rod 34 is slidably mounted in a bore in the housing 20 extending parallel to the axis of the chamber 21 and projecting beyond the closed extremity thereof. That portion of the rod which extends at right angles to the main portion thereof to engage the screw 35, rides in a longitudinal slot 36 communicating between the chamber 21 and the rod bore. The other extremity of the rod terminates in a flexible contact closing brush 37.

The device may be installed in the brake drum 12 by drilling a hole in the head of the drum for the nipple 23 and securing the latter in place therein by means of a suitable clamp nut 38. If it is not desired to drill a hole, one of the holes already in place in the brake drum and wheels for the bolts 15 may be used. The nipple 23 is then connected to the hose 18 through a second T-fitting 42 from which a typical tire valve stem 45 projects.

A contact screw 39 is passed through a suitable opening in the brake disc 11 in the circular path of the brush 37. This screw terminates in a rounded contact head 40 against which the brush 37 contacts when the rod 34 is in its projected position. The contact screw 39 is properly insulated from the brake disc 11 and is connected, as indicated by the wire 46 into any desired signal circuit on the vehicle so that current will flow from the battery through the desired signal, thence to the screw 39 and thence through the brush 37 and the rod 34 to the ground.

Let us assume that the proper air pressure is in both tires 16. This pressure is transmitted through the passage 22 into the interior of the expansible cup 24 causing the latter to expand and elongate within the guide tube 27. This forces the stem 30 and the plunger 28 outwardly from the tube causing the flange 31 to compress the spring 32 and causing the rod 34 to be drawn into the housing 20. This withdraws the brush 37 from contact with the head 40.

Now let us assume that the pressure falls in either tire due to a leak or puncture. This immediately lowers the air pressure in the passage 22 causing the cup 24 to retract, under the action of the spring 32. This retraction results in projecting the contact rod 34 so that, at each revolution of the wheel, the brush 37 will contact the contact head 40 to close the circuit to give a signal to the driver.

The screw 39 is provided with set nuts 41 by means of which the amount of projection of the screw into the brake drum can be varied. In this way the actuating stroke of the plunger 28 can be varied so that the circuit will be closed at any desired minimum of pressure.

It is desired to call particular attention to the expansible cup 24, which is illustrated more in detail in Fig. 4. This cup is preferably formed of impervious, flexible rubber and it is positively sealed to the passage 22 by the pressure of the guide bushing 25 so that there is no possibility of air leakage at any point in the device.

While the device has been described as more particularly applicable to the tires of dual wheels, it can be readily seen that it will be equally valuable for single tires, in which event, a single tube 18 will connect with the valve stem of the single tire. The couplings 43 on the various tubes are so designed that they slightly open the regular tire valve, as they are screwed into place, so that the internal air can exit to operate the device. Both tires can be simultaneously inflated through the single valve stem 45 on the second T-fitting 42.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. Means for moving a circuit closing contact in consequence of variations in air pressure comprising: a housing; a cylindrical operating chamber in said housing having an air inlet positioned concentrically at one extremity of said chamber; a flexible rubber cap; a flange surrounding said cap; a clamping bushing clamping said flange around said inlet, said cap extending through said bushing; a guide sleeve projecting from said bushing around said cap; a stem slidably mounted in said sleeve in contact with said cap to be actuated by the expansion of the latter; a head on said stem; a tubular skirt extending from said head about said guide sleeve; a flange on the extremity of said skirt; an annular abutment in said chamber about said head; and a spring compressed between said flange and said abutment to urge said stem against said cap, said head being operatively connected with said circuit closing contact.

2. Means for moving a circuit closing contact in consequence of variations in air pressure comprising: a housing; a cylindrical operating chamber in said housing having an air inlet positioned concentrically at one extremity of said chamber; a flexible rubber cap; a flange surrounding said cap; a clamping bushing clamping said flange around said inlet, said cap extending through said bushing; a guide sleeve projecting from said bushing around said cap; a stem slidably mounted in said sleeve in contact with said cap to be actuated by the expansion of the latter; a head on said stem; a tubular skirt extending from said head about said guide sleeve; a flange on the extremity of said skirt; an annular abutment in said chamber about said head; a spring compressed between said flange and said abutment to urge said stem against said cap, said head being operatively connected with said circuit closing contact; a guide bore in said housing alongside and parallel to said chamber; a contact rod slidably mounted in said bore and projecting beyond one extremity thereof; an angularly turned inner extremity on said rod projecting from said guide passage through a slot into said chamber; means for securing said inner extremity of said rod to said head; and a circuit closing contact on the projecting extremity of said rod.

3. Means for moving a circuit closing contact in consequence of variations in air pressure comprising: a housing; a cylindrical operating chamber in said housing having an air inlet positioned concentrically at one extremity of said chamber; a flexible rubber cap; a flange surrounding said cap; a clamping bushing clamping said flange around said inlet, said cap extending through said bushing; a guide sleeve projecting from said bushing around said cap; a stem slidably mounted in said sleeve in contact with said cap to be actuated by the expansion of the latter; a head on said stem; a tubular skirt extending from said head about said guide sleeve; a flange on the extremity of said skirt; an annular abutment in said chamber about said head; a spring compressed between said flange and said abutment to urge said stem against said cap, said head being operatively connected with said circuit closing contact; a guide bore in said housing alongside and parallel to said chamber; a contact rod slidably mounted in said bore and projecting beyond one extremity thereof; an angularly turned inner extremity on said rod projecting from said guide passage through a slot into said chamber; means for securing said inner extremity of said rod to said head; a circuit closing contact on the projecting extremity of said rod; and a threaded nipple projecting from said housing oppositely from said rod, said nipple being hollow and communicating with said inlet.

EDWARD F. SCHUBERT.